(12) United States Patent
Sasaki et al.

(10) Patent No.: US 7,903,975 B2
(45) Date of Patent: Mar. 8, 2011

(54) OPTICAL ADD-DROP MULTIPLEXER

(75) Inventors: Shinya Sasaki, Koganei (JP); Nobuhiko Kikuchi, Tokyo (JP); Kenro Sekine, Fuchu (JP)

(73) Assignee: Hitachi, Ltd., Chiyoda-ku, Tokyo (JP)

( * ) Notice: Subject to any disclaimer, the term of this patent is extended or adjusted under 35 U.S.C. 154(b) by 534 days.

(21) Appl. No.: 10/888,016

(22) Filed: Jul. 12, 2004

(65) Prior Publication Data

US 2005/0175041 A1 Aug. 11, 2005

(30) Foreign Application Priority Data

Feb. 10, 2004 (JP) ................................. 2004-033151

(51) Int. Cl.
*H04J 14/02* (2006.01)
(52) U.S. Cl. ................. 398/83; 398/82; 398/45; 398/67; 385/16; 385/24
(58) Field of Classification Search .................... 398/67, 398/82–88, 168; 359/341
See application file for complete search history.

(56) References Cited

U.S. PATENT DOCUMENTS

| | | | |
|---|---|---|---|
| 5,408,350 A * | 4/1995 | Perrier et al. ................. | 398/168 |
| 5,612,805 A * | 3/1997 | Fevrier et al. .................. | 398/83 |
| 5,717,795 A * | 2/1998 | Sharma et al. ................. | 385/24 |
| 6,211,980 B1 * | 4/2001 | Terahara ........................ | 398/82 |
| 6,385,362 B1 * | 5/2002 | Norwood ....................... | 385/14 |
| 6,519,064 B1 * | 2/2003 | Fatehi et al. .................... | 398/84 |
| 6,597,830 B1 * | 7/2003 | Nakabayashi et al. .......... | 385/24 |
| 6,868,201 B1 * | 3/2005 | Johnson et al. ................. | 385/24 |
| 2002/0089719 A1 * | 7/2002 | Joo et al. ........................ | 359/127 |
| 2002/0118446 A1 * | 8/2002 | Lee et al. .................... | 359/341.2 |
| 2003/0175029 A1 * | 9/2003 | Harney et al. .................. | 398/83 |
| 2004/0208584 A1 * | 10/2004 | Keller ............................ | 398/88 |
| 2004/0234266 A1 * | 11/2004 | Kim et al. ....................... | 398/83 |
| 2005/0226620 A1 * | 10/2005 | Feuer et al. .................... | 398/83 |

FOREIGN PATENT DOCUMENTS

| | | |
|---|---|---|
| JP | 10-020143 | 7/1996 |
| JP | 11-218729 | 1/1998 |
| JP | 2003-143077 | 10/2001 |
| JP | 2003-152645 | 11/2001 |

OTHER PUBLICATIONS

"Optical Add/Drop Multiplexers", Optical Fiber Communication Conference, 1998 Tutorial Sessions, p. 177.

* cited by examiner

*Primary Examiner* — Li Liu
(74) *Attorney, Agent, or Firm* — Stites & Harbison PLLC; Juan Carlos A. Marquez, Esq.

(57) ABSTRACT

A problem to be solved in an optical communication system for carrying out bidirectional transmission between communication nodes by wavelength-division-multiplexed optical signals is that a plurality of optical add-drop multiplexers installed in the communication nodes are required for each transmission direction, and therefore, the communication cost is increased. An optical circulator or an optical coupler is arranged at an input/output port of the optical add-drop multiplexer and the wavelength-division-multiplexed optical signals are assembled for each transmission direction, whereby optical signals transmitted bidirectionally can be handled by one optical add-drop multiplexer.

9 Claims, 8 Drawing Sheets

TRANSMISSION DIRECTION OF WAVELENGTH-DIVISION-MULTIPLEXED SIGNALS

OPTICAL ADD-DROP MULTIPLEXER

CLAIM OF PRIORITY

The present application claims priority from Japanese application JP 2004-033151, filed on Feb. 10, 2004, the content of which is hereby incorporated by reference into this application.

BACKGROUND OF THE INVENTION

1. Field of the Invention

The present invention relates to an optical transmission system for transmitting data by multiplexing a plurality of optical signals having different wavelengths. More specifically, the present invention relates to an optical add-drop multiplexer for dropping or adding an optical signal having a specific wavelength out of or to multiplexed optical signals.

2. Description of Related Art

Wavelength-division-multiplexed optical transmission systems for multiplexing optical signals having different wavelengths and transmitting the multiplexed signals through an optical fiber use an optical add-drop multiplexer. The optical add-drop multiplexer drops an optical signal having a specific wavelength to be received in a communication node, or adds an optical signal to be transmitted in this communication node to the above-described wavelength-division-multiplexed optical signals.

Figure 2:
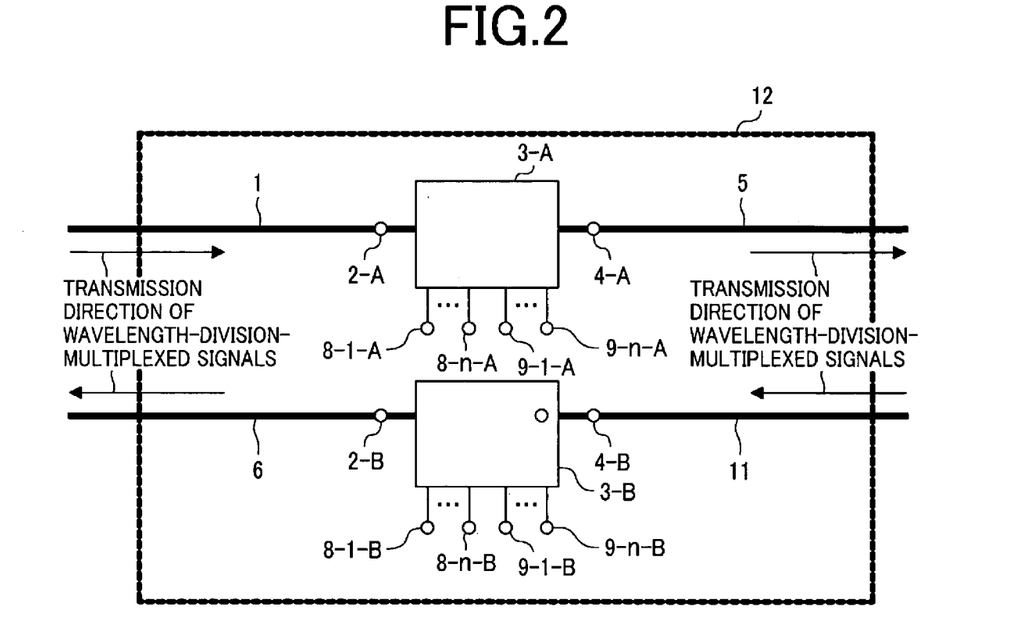
FIG. 2 is a construction diagram for explaining a prior art.

FIG. 2 is a construction diagram of a communication node 12 using optical add-drop multiplexers 3-A and 3-B. The communication node 12 is connected to adjacent communication nodes through a plurality of optical fibers 1, 5, 6 and 11. Wavelength-division-multiplexed optical signals are transmitted between communication nodes through different optical fibers in respective specified directions. In FIG. 2, for example, the optical fibers 1 and 5 are used for a signal to be transmitted from left to right on the paper, whereas the optical fibers 11 and 6 are used for a signal to be transmitted from right to left on the paper.

The communication node 12 needs the optical add-drop multiplexers for dropping an optical signal having a specific wavelength out of wavelength-division-multiplexed optical signals transmitted from an adjacent communication node, and for adding an optical signal to be transmitted from the communication node 12 to the wavelength-division-multiplexed optical signals. That is, the communication node 12 needs one optical add-drop multiplexer for each direction where a signal is transmitted (in FIGS. 2, 3-A and 3-B).

This communication node construction needs an optical add-drop multiplexer for each transmission direction (its example is described in Japanese Patent Laid-open No. 10-20143). Therefore, there arise problems in which the communication cost is increased due to this expensive device, the probability of failure doubles due to the complicated device, as a result, reliability of the communication system falls, and an office space is largely occupied.

A problem to be solved by the invention is that bidirectional transmission between communication nodes needs a plurality of optical add-drop multiplexers, which increases the communication cost.

SUMMARY OF THE INVENTION

Most principal characteristic of the present invention is that an optical circulator or an optical coupler is arranged at an input/output port of an optical add-drop multiplexer and wavelength-division-multiplexed optical signals are assembled for each direction.

The optical add-drop multiplexer of the present invention can realize a function of dropping or adding a wavelength-division-multiplexed optical signal for each direction in which an optical signal is transmitted by itself, so that the cost can be reduced to almost half as compared with that in the conventional construction. In addition, the multiplexer of the present invention has the advantages that its simplified construction enhances reliability and further, reduces its installation space.

DESCRIPTION OF THE PREFERRED EMBODIMENTS

In an optical transmission system where adjacent communication nodes are connected to each other through a plurality of optical fibers, add-drop multiplexing of an optical signal is realized in each communication node with minimum construction.

Embodiment 1

Figure 1:
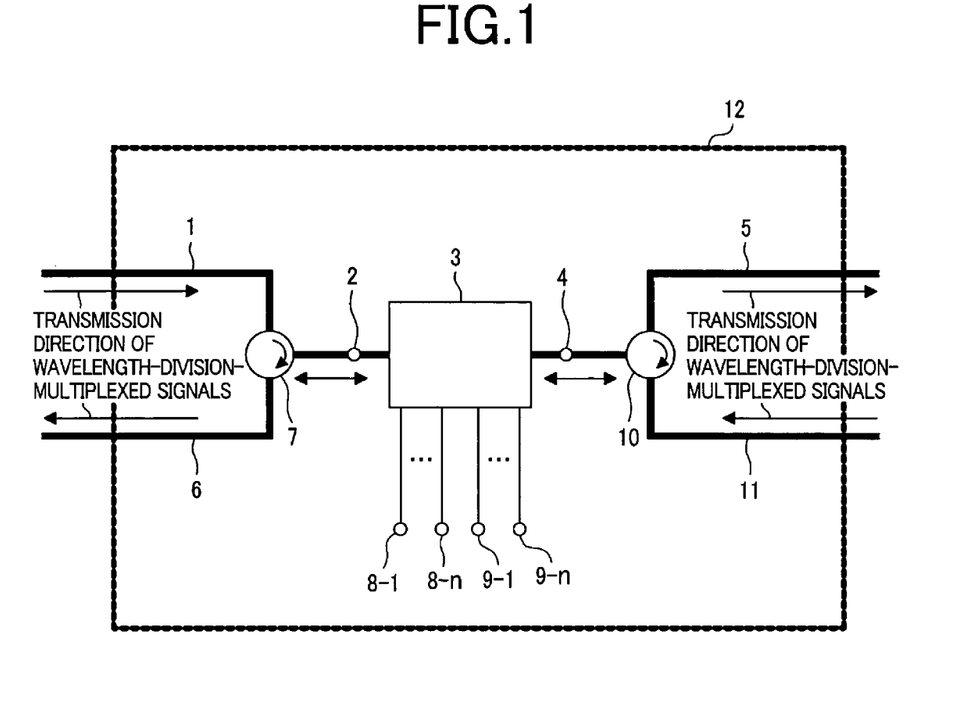
FIG. 1 is a construction diagram for explaining a first embodiment according to the present invention.

FIG. 1 is a construction diagram of a system according to a first embodiment of the present invention. A communication node 12 is connected to adjacent communication nodes through optical fibers 1, 5, 6 and 11. Optical signals propagate through the optical fibers 1 and 6 in directions opposite to each other. Optical signals propagating through the optical fibers 1 and 6 are combined by an optical circulator 7, which is connected to an input/output port 2 of an optical add-drop multiplexer 3. Similarly, optical signals propagate through the optical fibers 5 and 11 in directions opposite to each other. Optical signals propagating through the optical fibers 5 and 11 are combined by an optical circulator 10, which is connected to an input/output port 4 of the optical add-drop multiplexer 3.

The optical add-drop multiplexer 3 in the communication node 12 drops an optical signal having a specific wavelength i addressed to the communication node 12 from wavelengthdivision-multiplexed optical signals and outputs it to an add-drop port 8-$i$ or 9-$i$ (i=1, 2, ... n). Incidentally, notation "i" of, e.g., 8-$i$ corresponds to a wavelength i. The optical add-drop multiplexer 3 in the communication node 12 adds the optical signal having the wavelength i to be transmitted to another communication node from the add-drop port 8-$i$ or 9-$i$ (i=1, 2 ... n) to the wavelength-division-multiplexed optical signals. In the figure, only add-drop ports 8-1, 9-1, 8-$n$ and 9-$n$ are depicted; however, in practice, the add-drop ports for the other wavelengths are also provided. Needless to say, the maximum number of ports is equal to the number (n) of wavelength-division-multiplexed optical signals. A difference between the add-drop ports 8-$i$ and 9-$i$ is to be described. When an optical signal having a wavelength i is dropped out of wavelength-division-multiplexed optical signals inputted from the input/output port 2 of the optical add-drop multiplexer 3, the dropped optical signal having a wavelength i is output to the add-drop port 8-$i$. On the other hand, when an optical signal having a wavelength i is dropped out of wavelength-division-multiplexed optical signals inputted from an input/output port 4, the dropped optical signal having a wavelength i is outputted to the add-drop port 9-$i$. When an optical signal having a wavelength i is added from the add-drop port 8-$i$, the optical signal is wavelength-multiplexed with other wavelength-division-multiplexed optical signals in the optical add-drop multiplexer 3 and the multiplexed signals are outputted from the input/output port 2. When an optical signal having a wavelength i is added from the add-drop port 9-$i$, the optical signal is wavelength-multiplexed with other wavelength-division-multiplexed optical signals by the optical add-drop multiplexer 3 and the multiplexed signals are outputted from the input/output port 4. The ports 8-$i$ and 9-$i$ are defined as above.

Figure 4:
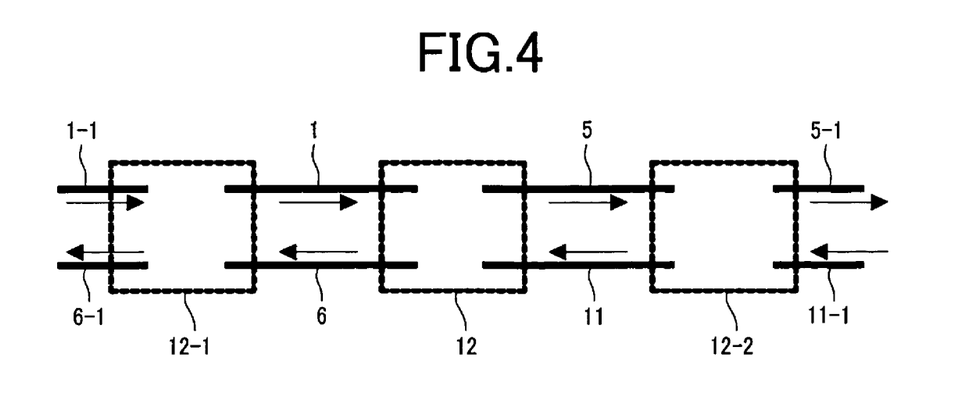
FIG. 4 is a diagram of showing connections between communication nodes.

Next, connection between the communication nodes is to be described. For example, as shown in FIG. 4, it is assumed that the communication nodes 12-1, 12 and 12-2 are connected to one another. Wavelength-division-multiplexed optical signals from the communication node 12-1 propagate through the optical fiber 1 into the communication node 12. The wavelength-division-multiplexed optical signals pass through the optical circulator 7 in FIG. 1 and the input/output port 2 and reach the optical add-drop multiplexer 3. This multiplexer 3 drops an optical signal addressed to the communication node, for example, an optical signal having a wavelength 1 out of the transmitted wavelength-division-multiplexed optical signals and outputs it to the add-drop port 8-1.

An optical signal to be transmitted from the communication node 12 to the communication node 12-1 in FIG. 4, for example, an optical signal having a wavelength n is added to the wavelength-division-multiplexed optical signals through the add-drop port 8-$n$ and the optical add-drop multiplexer 3 in FIG. 1, and is transmitted to the optical fiber 6 through the input/output port 2 and the optical circulator 7.

Figure 5:
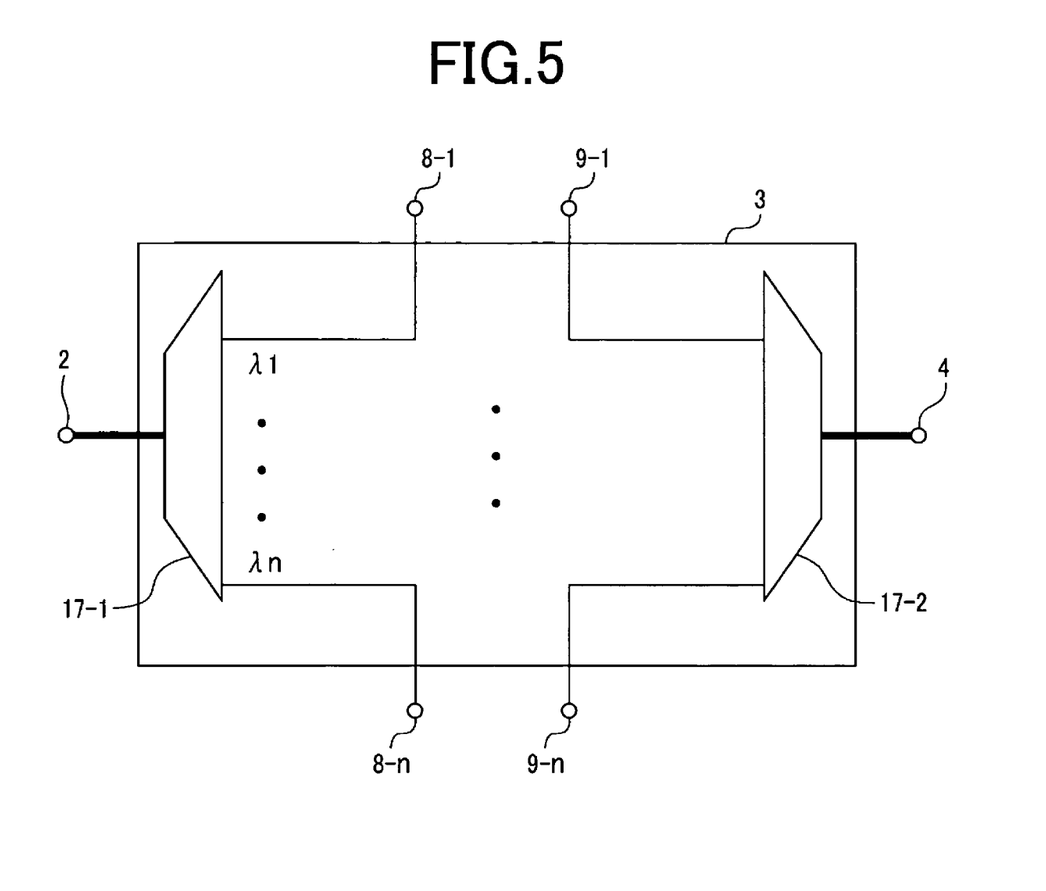
FIG. 5 is a diagram showing one example of an internal construction of the optical add-drop multiplexer.

Several examples of the specific internal construction of the optical add-drop multiplexer 3 are known. FIG. 5 shows a first example. Reference numerals 17-1 and 17-2 are each an optical multiplexer/demultiplexer, which has a function of wavelength-demultiplexing wavelength-division-multiplexed optical signals into optical signals having different wavelengths and on the contrary, a function of wavelength-multiplexing optical signals having different wavelengths in one optical fiber.

For example, wavelength-division-multiplexed optical signals (having respective wavelengths of $\lambda 1, \lambda 2, \ldots, \lambda n$) inputted from the input/output port 2 are wavelength-demultiplexed into n optical signals having different wavelengths by the optical multiplexer/demultiplexer 17-1, and the optical signals of different wavelengths are outputted from the add-drop ports 8-1, ..., 8-$n$, respectively. In this figure, only the add-drop ports 8-1 and 9-1 of the optical add-drop multiplexer for the wavelength $\lambda 1$, and the add-drop port 8-$n$ and 9-$n$ for the wavelength $\lambda n$ are depicted; however, the add-drop ports 8-$i$ and 9-$i$ (i=1, 2, ..., n) for n wavelengths $\lambda 1$, $\lambda 2, \ldots, \lambda n$ in the wavelength-division-multiplexed optical signal are provided in practice.

If the add-drop ports 8-1 and 9-1 are connected to each other through a short optical fiber, an optical signal having a wavelength, e.g., $\lambda 1$ passing through a communication node is wavelength-multiplexed with an optical signal having another wavelength by the optical multiplexer/demultiplexer 17-2 and the wavelength-multiplexed optical signals are transmitted from the input/output port 4. On the other hand, an optical signal having a wavelength, e.g., $\lambda n$ can be received by this communication node, if the add-drop port 8-$n$ is connected to an optical receiver installed within the communication node. Further, when an optical signal having a wavelength, e.g., $\lambda n$ is transmitted from this communication node to another communication node, the add-drop port 9-$n$ is connected to an optical transmitter installed within the communication node. This optical signal is wavelength-multiplexed with an optical signal having another wavelength by the optical multiplexer/demultiplexer 17-2 and the wavelength-multiplexed optical signals are transmitted from the input/output port 4.

The above example describes a case where wavelength-division-multiplexed optical signals are inputted from the input/output port 2. The same is true of a case where wavelength-division-multiplexed optical signals are inputted from the input/output port 4. That is, this optical add-drop multiplexer operates irrespective of a traveling direction of an optical signal.

Figure 6:
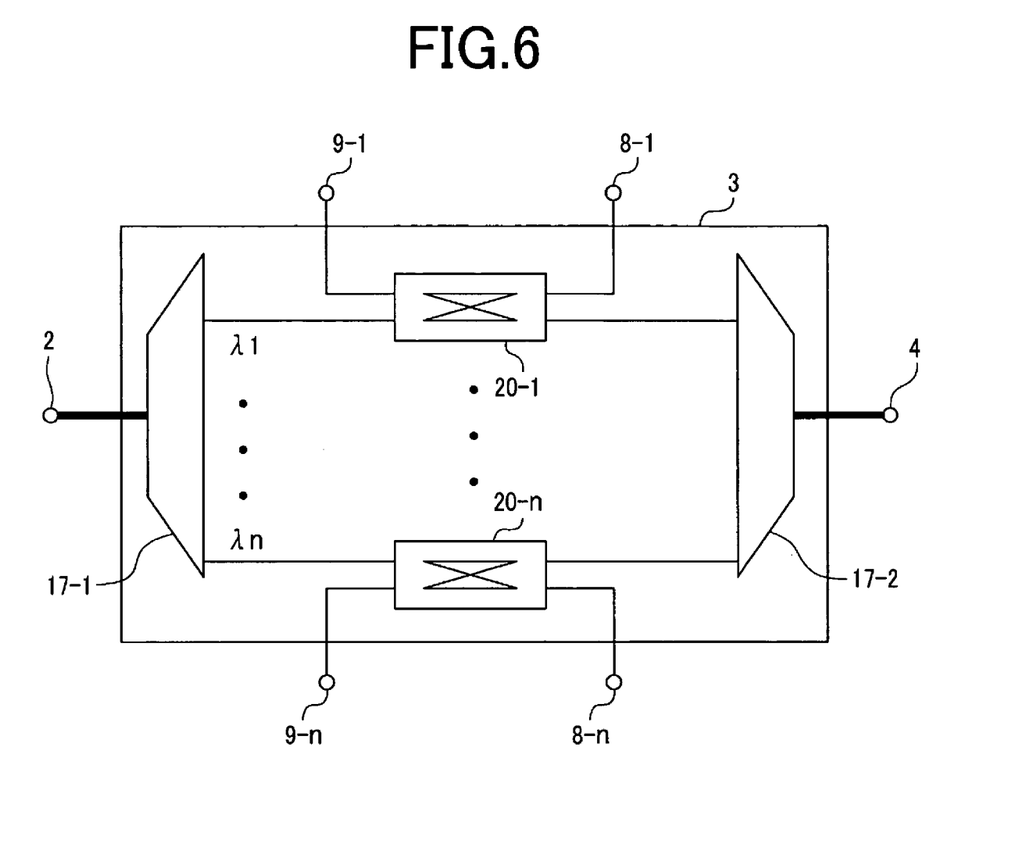
FIG. 6 is a diagram showing another example of an internal construction of the optical add-drop multiplexer.

FIG. 6 shows another example of the internal construction of the optical add-drop multiplexer 3. Reference numerals 17-1 and 17-2 each denote an optical multiplexer/demultiplexer. Reference numerals 2 and 4 each denote an input/output port. Further, reference numerals 8-1, 8-$n$, 9-1 and 9-$n$ each denote an add-drop port of the optical add-drop multiplexer. Reference numerals 20-1 and 20-$n$ each denote an optical switch having two inputs and two outputs (hereinafter referred to as 2×2). In the figure, only two 2×2 optical switches are depicted; however, the maximum number of 2×2 optical switches to be installed in practice is equal to the number (n) of wavelength-division-multiplexed optical signals. Each of the optical switches is connected to the port for each of the wavelengths ($\lambda 1, \lambda 2, \ldots, \lambda n$) in the optical multiplexer/demultiplexers 17-1 and 17-2. For example, a wavelength-division-multiplexed optical signal (wavelength: $\lambda 1, \lambda 2, \ldots, \lambda n$) entering from the input/output port 2 is wavelength-demultiplexed into n optical signals having different wavelengths by the optical multiplexer/demultiplexer 17-1. The demultiplexed optical signals are directed into n 2×2 optical switches 20-1, ..., 20-$n$, respectively. When these optical switches are brought into a bar state, an optical signal having a wavelength corresponding to the optical switch in the bar state passes through the communication node, whereas when the optical switches are brought into a cross state, an optical signal having a wavelength corresponding to the optical switch in the cross state can be dropped or added in the communication node. These optical signals that pass through the 2×2 optical switches are wavelength-multiplexed by the optical multiplexer/demultiplexer 17-2. The wavelength-multiplexed optical signals are then outputted from the input/output port 4, and transmitted to the next communication node.

The above example describes a case where wavelength-division-multiplexed optical signals are inputted from the input/output port 2. The same is true of a case where a wavelength-division-multiplexed optical signal is inputted from the input/output port 4. That is, this optical add-drop multiplexer operates irrespective of a traveling direction of an optical signal.

Figure 7:
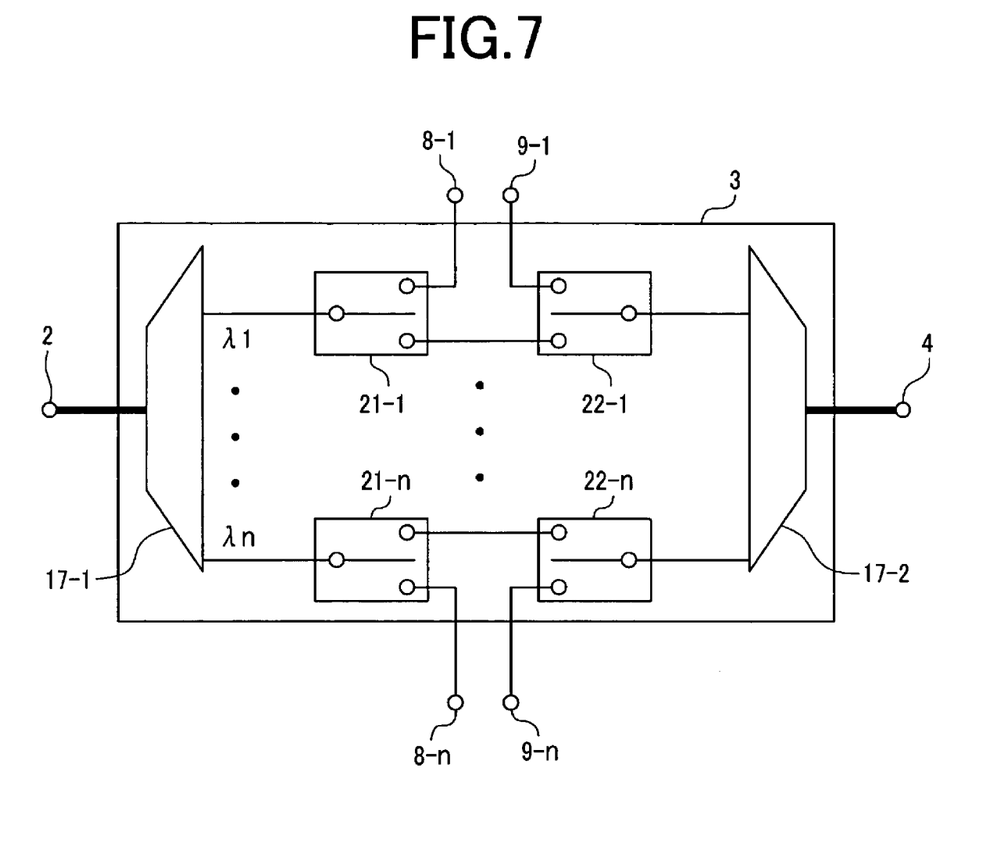
FIG. 7 is a diagram showing yet another example of an internal construction of the optical add-drop multiplexer.

FIG. 7 shows a third example of the internal construction in the optical add-drop multiplexer 3. In this figure, reference numerals 21-1 and 22-1 each denote an optical switch having one input and two outputs for switching an optical signal having a wavelength $\lambda 1$. Similarly, reference numerals 21-*n* and 22-*n* each denote an optical switch for switching an optical signal having a wavelength $\lambda n$. That is, a construction in FIG. 7 is such that the optical switch having two inputs and two outputs in FIG. 6 is replaced by two optical switches having one input and two outputs.

Figure 8:
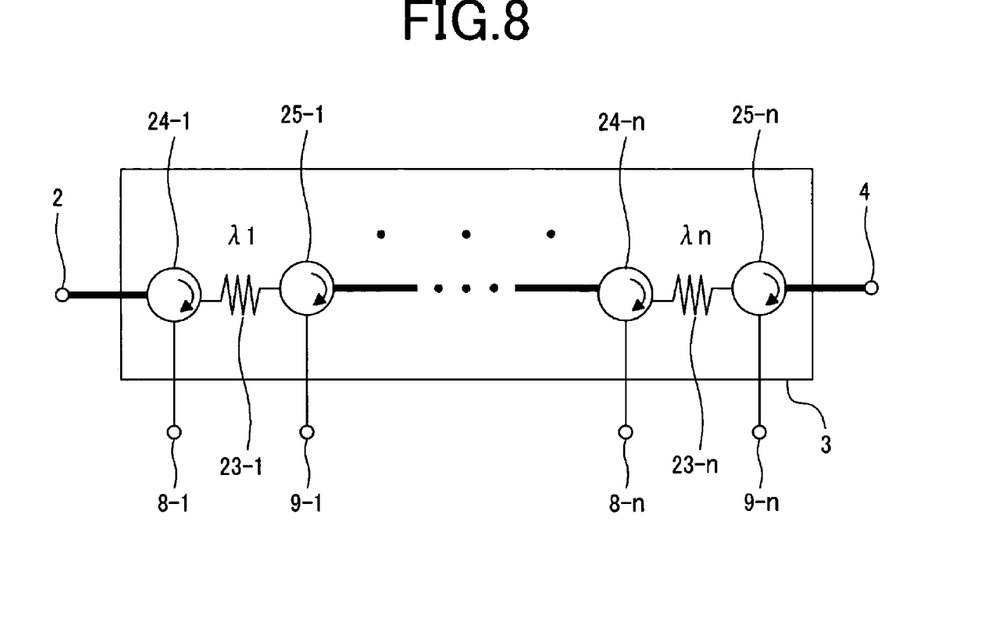
FIG. 8 is a diagram showing further another example of an internal construction of the optical add-drop multiplexer.

FIG. 8 shows a fourth example of the internal construction of the optical add-drop multiplexer 3. In this figure, reference numeral 23-1 denotes a fiber Bragg grating, which reflects only an optical signal having a wavelength $\lambda 1$. Reference numerals 24-1 and 25-1 each denote an optical circulator. Similarly, reference numeral 23-*n* denotes a fiber Bragg grating, which reflects only a optical signal having the wavelength $\lambda n$, and reference numerals 24-*n* and 25-*n* each denote an optical circulator. That is, the optical add-drop multiplexer 3 having this construction includes combinations each consisting of two circulators and a grating connectedly interposed therebetween. The combinations are connected in series, the number of which is equal to the maximum number of wavelength-division-multiplexed optical signals (n in this figure). The n fiber Bragg gratings are configured to reflect the optical signals having the wavelengths $\lambda 1, \lambda 2, \ldots, \lambda n$, respectively, out of the wavelength-division-multiplexed optical signals.

Operations of the optical add-drop multiplexer 3 in FIG. 8 are described below. An example is taken in which the wavelength-division-multiplexed optical signals having the wavelengths $\lambda 1, \ldots, \lambda n$ are directed into the optical add-drop multiplexer 3 from the input/output port 2. It is assumed that the optical signals having the wavelengths $\lambda 1, \lambda 2, \ldots, \lambda n-1$ pass through the communication node in which this optical add-drop multiplexer 3 is installed. Further, it is assumed that the optical signal having the wavelength $\lambda n$ is received in this communication node. In this case, the optical signal having the wavelength $\lambda 1$ passes through the optical circulator 24-1, is reflected by the fiber Bragg grating 23-1 and is directed to the add-drop port 8-1. If the add-drop ports 8-1 and 9-1 are connected to each other through an optical fiber, this optical signal is directed to the optical circulator 25-1, and then reflected by the fiber Bragg grating 23-1 again. The reflected optical signal passes through the optical circulator 25-1 again, then passes through the other optical circulators and fiber Bragg gratings and is outputted from the input/output port 4. The optical signals having the other wavelengths $\lambda 2, \ldots, \lambda n-1$ that pass through the communication node also travel in the same way as the optical signal having the wavelength $\lambda 1$.

On the other hand, the optical signal having the wavelength $\lambda n$ passes through the optical circulator 24-1, the fiber Bragg grating 23-1 and the optical circulator 25-1. Similarly, the optical signal passes through the optical circulators and fiber Bragg gratings for the other wavelengths and reaches the optical circulator 24-*n*. The optical signal that has passed through this optical circulator is reflected by the fiber Bragg grating 23-*n*, passes through the optical circulator 24-*n* again and is outputted to the add-drop port 8-*n*. Connected to this port 8-*n*, a receiver receives the optical signal having the wavelength $\lambda n$.

When the optical signal having the wavelength $\lambda n$ is transmitted to another communication node (assuming 12-2 in FIG. 4 as an example) from this communication node, a transmitter is connected to the add-drop port 9-*n*. Thus, the optical signal passes through the optical circulator 25-*n*, and is reflected by the fiber Bragg grating 23-*n*. The reflected optical signal passes through the optical circulator 25-*n* again, is outputted from the input/output port 4 and is transmitted to the next communication node along with the optical signals having the other wavelengths $\lambda 1, \ldots, \lambda n-1$.

The above example describes a case where wavelength-division-multiplexed optical signals are inputted from the input/output port 2. The same is true of a case where wavelength-division-multiplexed optical signals are inputted from the input/output port 4. That is, this optical add-drop multiplexer operates irrespective of a traveling direction of an optical signal.

FIGS. 5, 6, 7 and 8 above each shows a specific construction example of the optical add-drop multiplexer 3; however, the construction thereof is not limited to the above-described four examples. Incidentally, the construction examples in FIGS. 5 and 8 are described in OFC (Optical Fiber Communication Conference) '98 TUTORIAL SESSIONS, p. 177, 1998.

Now, arrangement of optical transmitters and receivers in a case of carrying out communication between the communication nodes each provided with the optical add-drop multiplexer in the first embodiment is described below.

A case where the communication node 12 and communication node 12-1 in FIG. 4 perform communication therebetween using an optical signal having a wavelength $\lambda i$ is described by way of example. It is assumed that optical signals having the other wavelengths ($\lambda 1, \ldots, \lambda i-1, \lambda i+1, \ldots, \lambda n$) pass through the communication nodes.

Figure 9:
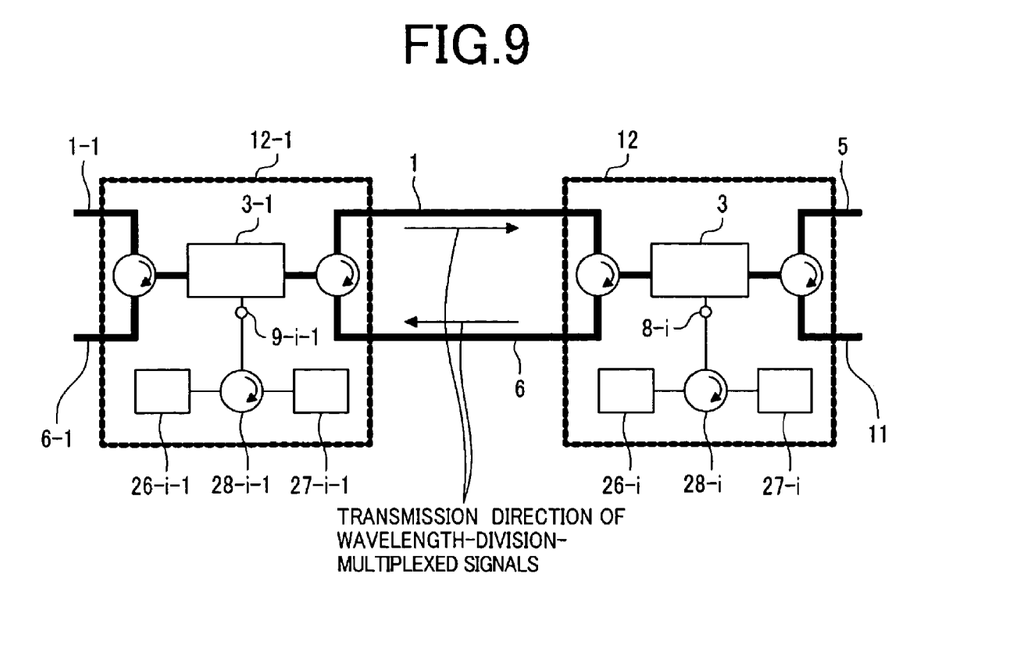
FIG. 9 is a view of showing an arrangement of optical transmitters and receivers within a communication node in a case of carrying out optical transmission between adjacent communication nodes.

FIG. 9 shows a node configuration including optical transmitters and receivers. Reference numerals 26-*i* and 26-*i*-1 each denote an optical transmitter for the optical signal having the wavelength i, and reference numerals 27-*i* and 27-*i*-1 each denote an optical receiver for the optical signal having the wavelength i. The optical transmitter 26-*i*-1 and receiver 27-*i*-1 are each connected to the optical add-drop multiplexers 3-1 and its add-drop ports 9-*i*-1 through the optical circulators 28-*i*-1 as shown in the figure. Similarly, the optical transmitter 26-*i* and receiver 27-*i* are each connected to the optical add-drop multiplexers 3 and its add-drop ports 8-*i* through the optical circulators 28-*i*.

The optical signal having the wavelength i from the optical transmitter 26-*i* within the communication node 12 passes through the optical circulator 28-*i*, and is wavelength-division-multiplexed with optical signals having other wavelengths by the optical add-drop multiplexer 3. The multiplexed optical signals propagate through the optical fiber 6 for transmission through the optical circulator and reaches the communication node 12-1. Then, the optical signal having the wavelength i is dropped from the optical signals having the other wavelengths by the optical add-drop multiplexer 3-1, and is outputted from the add-drop port 9-*i*-1. After passing through the optical circulator 28-*i*-1, this optical signal having the wavelength i is received by the optical receiver 27-*i*-1.

Similarly, the optical signal having the wavelength i outputted from the optical transmitter 26-*i*-1 within the communication node 12-*i* is wavelength-division-multiplexed with the other wavelength-division-multiplexed optical signals by the optical add-drop multiplexer 3-1. The multiplexed optical signals propagate through the optical fiber 1 for transmission and reach the communication node 12. Then, the optical signal having the wavelength i is dropped from the optical signals having the other wavelengths by the optical add-drop multiplexer 3, and is outputted from the add-drop port 8-$i$. After passing through the optical circulator 28-$i$, this optical signal having the wavelength i is received by the optical receiver 27-$i$. As described above, the communication nodes 12 and 12-1 can perform communication therebetween using the optical signal having the wavelength i. In the above description of FIG. 9, reference numerals 28-$i$ and 28-$i$-1 each is described as an optical circulator; however, optical couplers may be used in place of these optical circulators.

When the optical circulator according to the first embodiment is used, an insertion loss of the optical circulator is on the order of 0.5 dB and therefore, a transmission loss of light is small, in particular, as compared with that in a second embodiment described later. Further, an optical circulator advantageously have the transmissive directivity of light, and therefore, it eliminates an optical isolator used in combination therewith, that is, it reduces the number of components.

Embodiment 2

Figure 3:
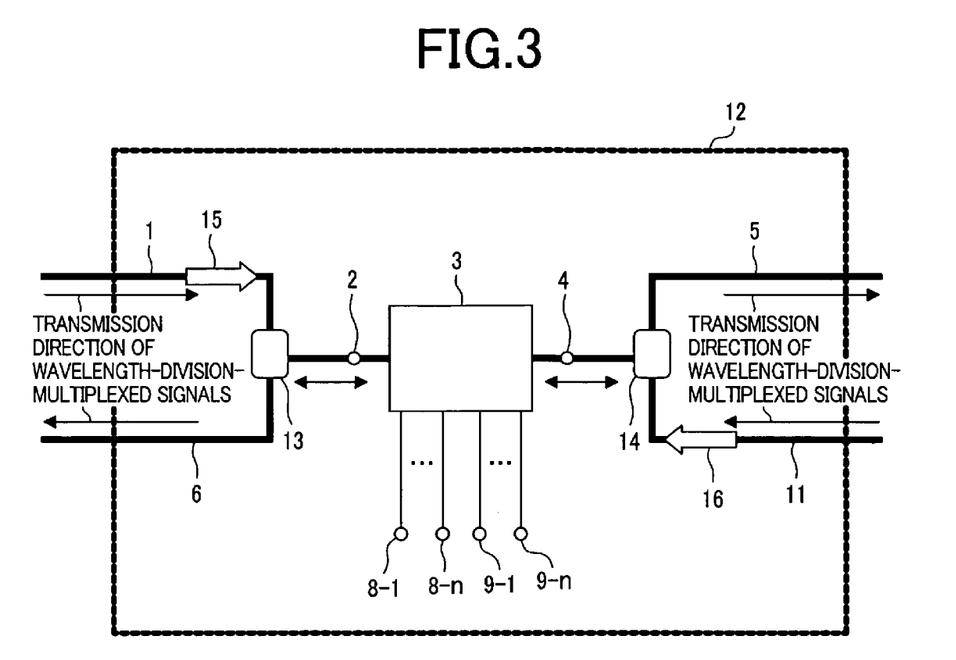
FIG. 3 is a construction diagram for explaining a second embodiment according to the present invention.

FIG. 3 shows a second embodiment of the present invention. The second embodiment differs from the first embodiment in that optical couplers 13 and 14 are used in place of the optical circulators 7 and 10 in FIG. 1, respectively. A communication node 12 is connected to adjacent communication nodes by the optical fibers 1, 5, 6 and 11. Optical signals propagate through the optical fibers 1 and 6 in directions opposite to each other. The optical signals propagating through the optical fibers 1 and 6 are combined by the optical coupler 13, which is connected to an input/output port 2 of an optical add-drop multiplexer 3. Similarly, optical signals propagate through the optical fibers 5 and 11 in directions opposite to each other. Optical signals propagating through the optical fibers 5 and 11 are combined by the optical coupler 14, which is connected to an input/output port 4 of the optical add-drop multiplexer 3.

Wavelength-division-multiplexed optical signals traveling in directions opposite to each other are combined by using optical couplers as below. For example, wavelength-division-multiplexed optical signals that are outputted from the input/output port 2 and travel toward a left communication node on the paper are about to propagate, from the optical coupler, through both the optical fibers 1 and 6 for transmission. For this reason, an optical isolator 15 is used so that the optical signals will not propagate through the optical fiber 1 in the opposite direction. Similarly, an optical isolator 16 is used so that wavelength-division-multiplexed optical signals transmitted from the port 4 to a right communication node on the paper will not be allowed to propagate through the optical fiber 11 in the opposite direction.

The optical add-drop multiplexer 3 in FIG. 3 may have the same specific construction as those of FIGS. 5, 6, 7 and 8 shown in the first embodiment.

The optical transmitter and receiver configuration where communication between the communication nodes is carried out concretely by the optical signal having the wavelength i according to the second embodiment may be the same as that described in the first embodiment. That is, the configuration is as shown in FIG. 9.

According to the second embodiment, an insertion loss of the optical coupler is 3 dB or more; however, the optical coupler has an advantage that the component costs can be reduced as compared with the optical circulator for use in the first embodiment. Further, the optical coupler has an advantage that the device costs can be totally reduced to half even taking into consideration the component costs of an optical isolator used in combination with an optical coupler.

Figure 10:
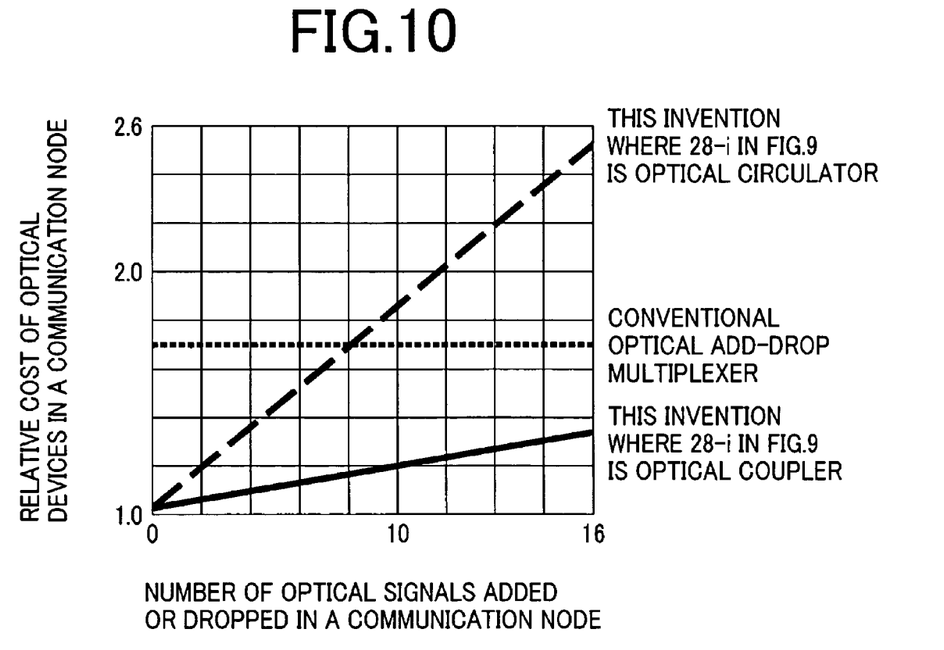
FIG. 10 is a graph of showing a cost comparison between optical components in a communication node.

Lastly, reduction in the cost of an optical add-drop multiplexer as an object of the present invention is quantitatively estimated as compared with that in conventional example. The cost of optical components in a communication node is taken up among the costs. It is assumed that the number of multiplexed signals in wavelength-division-multiplexed optical signals is 16. The cost of optical components in a communication node is a function of the number of added or dropped optical signals in the communication node. FIG. 10 shows a graph, assuming that the construction in FIG. 5 is an internal construction of the optical add-drop multiplexer, comparing the cost of optical components in the first embodiment of the present invention with the cost of optical components in a conventional example in the communication node having different devices in upward and downward directions. This graph shows, with respect to the present invention, both the case where reference numeral 28-$i$ in FIG. 9 is an optical circulator and the case where it is an optical coupler. As seen from this graph, the conventional example requires the definite cost of optical components irrespective of the number of signals to be added or dropped in the communication node. In the present invention, the cost of optical components in the communication node increases in proportion to the number of signals to be added/dropped. In the case where an optical circulator as denoted by reference numeral 28-$i$ in FIG. 9 is used, that is, an optical device for combining/deviding optical signals in the transmitter/receiver is used, it is understood that the cost of optical components is more reduced than that of the conventional example when the number of signals to be added or dropped is 8 or less. Further, in the case where an optical coupler as denoted by reference numeral 28-$i$ in FIG. 9 is used, that is, an optical device for combining/deviding optical signals in the transmitter/receiver is used, it is understood that the cost of optical components of the present invention is more reduced than that of the conventional example when the number of signals to be added or dropped is 16 or less, that is, the number is any.

Figure 11:
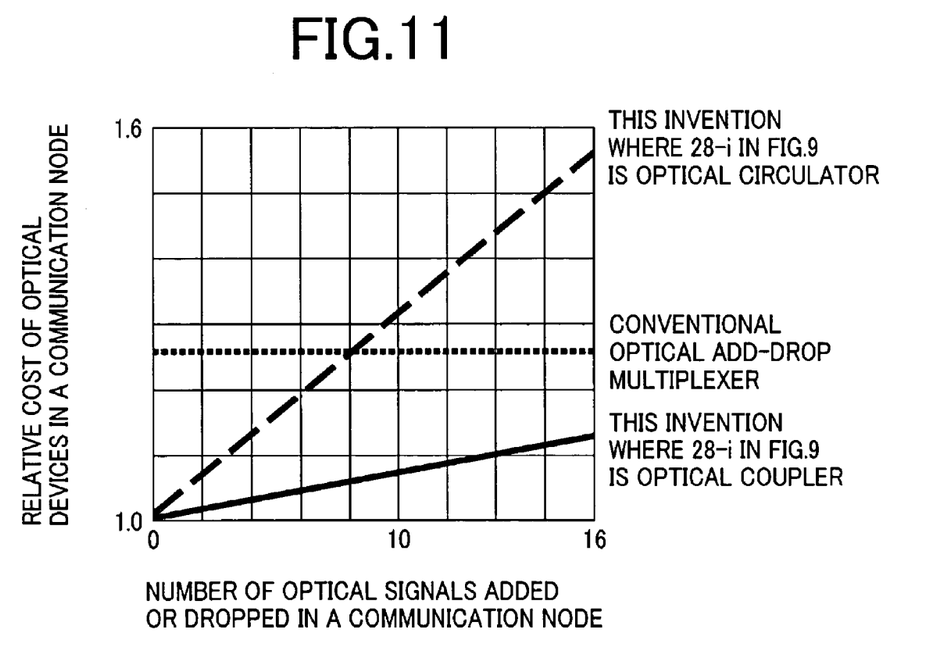
FIG. 11 is a second graph showing a cost comparison between optical components in a communication node.

A second example of the cost comparison is shown in FIG. 11. This figure assumes the construction in FIG. 6 as an internal construction of the optical add-drop multiplexer. As seen from FIG. 11, when reference numeral 28-$i$ in FIG. 9 is an optical circulator, the cost of optical components of the present invention is more reduced than that of the conventional example when the number of signals to be added or dropped is 8 or less. When reference numeral 28-$i$ in FIG. 9 is an optical coupler, the cost of optical components of the present invention is more reduced than that of the conventional example in all the cases.

As seen from the above-described two examples, the present invention can reduce the cost of communication nodes.

Incidentally, description of reference numerals used in the drawings of this application is as follows:

1, 1-1, 5, 5-1, 6, 6-1, 11, 11-1 . . . . Optical fibers for transmission connecting communication nodes, 2, 4, 2-A, 4-A, 2-B, 4-B . . . Input/output ports of optical add-drop multiplexer, 3, 3-A, 3-B . . . Optical add-drop multiplexers, 7, 10, 24-1, 24-$n$, 25-1, 25-$n$, 28-$i$, 28-$i$-1 . . . Optical circulators, 8-1, 8-$n$, 9-1, 9-$n$, 8-1-A, 8-$n$-A, 9-1-A, 9-$n$-A, 8-1-B, 8-$n$-B, 9-1-B, 9-$n$-B, 9-$i$-1 . . . Add/drop ports of optical of add-drop multiplexer, 12, 12-1, 12-2 . . . Communication nodes, 13, 14 . . . Optical couplers, 15, 16 . . . Optical isolators, 17-1, 17-2 . . . Optical multiplexers/demultiplexers, 20-1, 20-n . . . Optical switches having two inputs and two outputs, 21-1, 21-n, 22-1, 22-n . . . Optical switches having one input and two outputs, 23-1, 23-n . . . Fiber Bragg gratings, 26-i, 26-i-1 . . . Optical transmitters, 27-i, 27-i-1 . . . Optical receivers.

What is claimed is:

1. An optical add-drop multiplexer for dropping an optical signal having a specific wavelength out of wavelength-division-multiplexed optical signals or adding an optical signal to be transmitted to the wavelength-division-multiplexed optical signals, comprising:

a first optical circulator connected to a first optical fiber transmission line for transmitting optical signals in a first direction and a second optical fiber transmission line for transmitting optical signals in a second direction opposite to the first direction;

a first multiplexer/demultiplexer connected to the first optical circulator, demultiplexing multiplexed optical signals received via the first optical fiber transmission line, and multiplexing optical signals having a plurality of different wavelengths;

a first optical switch connected to the first multiplexer/demultiplexer, receiving demultiplexed optical signals having a first wavelength from the first multiplexer/demultiplexer, and outputting the demultiplexed optical signals having the first wavelength received from the first multiplexer/demultiplexer;

a first add-drop port connected to the first optical switch;

a first receiver for receiving the demultiplexed optical signals having the first wavelength upon the demultiplexed optical signals having the first wavelength being output from the first optical switch via the first add-drop port;

a first transmitter for transmitting optical signals having the first wavelength to the first multiplexer/demultiplexer via the first add-drop port;

a second optical circulator connected to a third optical fiber transmission line for transmitting optical signals in the first direction and a fourth optical fiber transmission line for transmitting optical signals in the second direction;

a second multiplexer/demultiplexer connected to the second optical circulator, demultiplexing multiplexed optical signals received via the fourth optical fiber transmission line, and multiplexing optical signals having the plurality of different wavelengths;

a second optical switch connected to the second multiplexer/demultiplexer and the first optical switch, receiving demultiplexed optical signals having the first wavelength from the second multiplexer/demultiplexer, and outputting the multiplexed optical signals having the first wavelength received from the second multiplexer/demultiplexer a second add-drop port connected to the second optical switch;

a second receiver for receiving the demultiplexed optical signals having the first wavelength upon the demultiplexed optical signals having the first wavelength being output from the second optical switch via the second add-drop port; and a second transmitter for transmitting optical signals having the first wavelength to the second multiplexer/demultiplexer via the second add-drop port.

2. The optical add-drop multiplexer according to claim 1, wherein the first multiplexer/demultiplexer demultiplexes a first multiplexed optical signal received via the first optical transmission line into a first plurality of demultiplexed optical signals respectively having the plurality of different wavelengths and outputs a first optical signal of the first plurality of demultiplexed optical signals to the first optical switch, the first optical signal having the first wavelength, wherein the first optical switch outputs the first optical signal via the first add-drop port, wherein the first receiver receives the first optical signal output from the first optical switch via the first add-drop port, wherein the first transmitter transmits a second optical signal having the first wavelength to the first optical switch via the first add-drop port, and wherein the first multiplexer/demultiplexer receives the second optical signal from the first optical switch and a second plurality of optical signals, multiplexes the second optical signal and the second plurality of optical signals into a second multiplexed signal, and outputs the second multiplexed signal along the second optical fiber transmission line via the first optical circulator.

3. The optical add-drop multiplexer according to claim 1, wherein the second multiplexer/demultiplexer demultiplexes a third multiplexed optical signal received via the fourth optical transmission line into a third plurality of demultiplexed optical signals respectively having the plurality of different wavelengths and outputs a third optical signal of the third plurality of demultiplexed optical signals to the second optical switch, the third optical signal having the first wavelength, wherein the second optical switch outputs the third optical signal via the second add-drop port, wherein the second receiver receives the third optical signal output from the second optical switch via the second add-drop port, wherein the second transmitter transmits a fourth optical signal having the first wavelength to the second optical switch via the second add-drop port, and wherein the second multiplexer/demultiplexer receives the fourth optical signal from the second optical switch and a fourth plurality of optical signals, multiplexes the fourth optical signal and the fourth plurality of optical signals into a fourth multiplexed optical signal, and outputs the fourth multiplexed signal along the third optical fiber transmission line via the second optical circulator.

4. The optical add-drop multiplexer according to claim 1, wherein a second optical add-drop multiplexer transmits wavelength-division-multiplexed optical signals along the first optical fiber transmission line to the first optical circulator and receives wavelength-division-multiplexed optical signals via the second optical fiber transmission line from the first optical circulator, and wherein a third optical add-drop multiplexer receives wavelength-division-multiplexed optical signals from the second optical circulator along the third optical fiber transmission line and transmits wavelength-division-multiplexed optical signals to the second optical circulator via the fourth optical fiber transmission line.

5. The optical add-drop multiplexer according to claim 1, wherein the first optical switch and the second optical switch each have an input terminal, a first output terminal, and a second output terminal, respectively, wherein the input terminal of the first optical switch is connected with an output terminal of the first multiplexer/demultiplexer and the first output terminal of the first optical switch is connected with the first add-drop port, and wherein the input terminal of the second optical switch is connected with an output terminal of the second multiplexer/demultiplexer, the first output terminal of the second optical switch is connected with the second add-drop port, and the second output terminal of the first optical switch is connected with the second output terminal of the second optical switch.

6. An optical add-drop multiplexer for dropping an optical signal having a specific wavelength out of wavelength-division-multiplexed optical signals or adding an optical signal to be transmitted to the wavelength-division-multiplexed optical signals, comprising:

a first optical coupler connected to a first optical fiber transmission line for transmitting optical signals in a first direction and a second optical fiber transmission line for transmitting optical signals in a second direction opposite to the first direction;

a first multiplexer/demultiplexer connected to the first optical coupler, demultiplexing multiplexed optical signals received via the first optical fiber transmission line, and multiplexing optical signals having a plurality of different wavelengths;

a first optical switch connected to the first multiplexer/demultiplexer, receiving demultiplexed optical signals having a first wavelength from the first multiplexer/demultiplexer, and outputting the demultiplexed optical signals having the first wavelength received from the first multiplexer/demultiplexer;

a first add-drop port connected to the first optical switch;

a first receiver for receiving the demultiplexed optical signals having the first wavelength upon the demultiplexed optical signals having the first wavelength being output from the first optical switch via the first add-drop port;

a first transmitter for transmitting optical signals having the first wavelength to the first multiplexer/demultiplexer via the first add-drop port;

a second optical coupler connected to a third optical fiber transmission line for transmitting optical signals in the first direction and a fourth optical fiber transmission line for transmitting optical signals in the second direction;

a second multiplexer/demultiplexer connected to the second optical coupler, demultiplexing multiplexed optical signals received via the fourth optical fiber transmission line, and multiplexing optical signals having the plurality of different wavelengths;

a second optical switch connected to the second multiplexer/demultiplexer and the first optical switch, receiving demultiplexed optical signals having the first wavelength from the second multiplexer/demultiplexer, and outputting the demultiplexed optical signals having the first wavelength received from the second multiplexer/demultiplexer;

a second add-drop port connected to the second optical switch;

a second receiver for receiving the demultiplexed optical signals having the first wavelength upon the demultiplexed optical signals having the first wavelength being output from the second optical switch via the second add-drop port; and a second transmitter for transmitting optical signals having the first wavelength to the second multiplexer/demultiplexer via the second add-drop port.

7. The optical add-drop multiplexer according to claim 6, wherein the first optical switch and the second optical switch each have an input terminal, a first output terminal, and a second output terminal, respectively, wherein the input terminal of the first optical switch is connected with an output terminal of the first multiplexer/demultiplexer and the first output terminal of the first optical switch is connected with the first add-drop port, and wherein the input terminal of the second optical switch is connected with an output terminal of the second multiplexer/demultiplexer, the first output terminal of the second optical switch is connected with the second add-drop port, and the second output terminal of the first optical switch is connected with the second output terminal of the second optical switch.

8. The optical add-drop multiplexer according to claim 7, wherein an optical isolator configured to prevent propagation of optical signals transmitted in the second direction is arranged on a route of the first optical fiber transmission line, the optical isolator is connected with a port of the first optical coupler, another optical isolator configured to prevent propagation of optical signals transmitted in the first direction is arranged on a route of fourth optical fiber transmission line, and the another optical isolator is connected with a port of the second optical coupler.

9. The optical add-drop multiplexer according to claim 8, wherein a second optical add-drop multiplexer transmits wavelength-division-multiplexed optical signals along the first optical fiber transmission line to the first optical coupler and receives wavelength-division-multiplexed optical signals via the second optical fiber transmission line from the first optical coupler, and wherein a third optical add-drop multiplexer receives wavelength-division-multiplexed optical signals from the second optical coupler along the third optical fiber transmission line and transmits wavelength-division-multiplexed optical signals to the second optical coupler via the fourth optical fiber transmission line.

\* \* \* \* \*